United States Patent
Schreiber

(10) Patent No.: US 8,583,312 B2
(45) Date of Patent: Nov. 12, 2013

(54) GUIDANCE SYSTEM AUTOMATIC WHEEL ANGLE SENSOR CALIBRATION

(75) Inventor: Zachary J. Schreiber, Halstead, KS (US)

(73) Assignee: AGCO Corporation, Duluth, GA (US)

(*) Notice: Subject to any disclaimer, the term of this patent is extended or adjusted under 35 U.S.C. 154(b) by 212 days.

(21) Appl. No.: 13/214,322

(22) Filed: Aug. 22, 2011

(65) Prior Publication Data

US 2013/0054074 A1    Feb. 28, 2013

(51) Int. Cl.
   *B62D 15/02*    (2006.01)
   *G05D 1/02*     (2006.01)

(52) U.S. Cl.
   USPC .............................................. 701/23; 701/41

(58) Field of Classification Search
   USPC ...................................................... 701/23, 41
   See application file for complete search history.

(56) References Cited

U.S. PATENT DOCUMENTS

| | | | |
|---|---|---|---|
| 5,245,422 A | | 9/1993 | Borcherts et al. |
| 5,370,588 A | | 12/1994 | Sawase et al. |
| 5,465,210 A | * | 11/1995 | Walenty ............................. 701/1 |
| 5,732,372 A | * | 3/1998 | Marsden .......................... 701/41 |
| 6,082,171 A | * | 7/2000 | Wiggenhagen ................ 73/1.75 |
| 6,256,893 B1 | * | 7/2001 | Forborgen .................... 33/1 PT |
| 6,686,951 B1 | | 2/2004 | Dickson et al. |
| 7,225,060 B2 | * | 5/2007 | O'Connor et al. ................. 701/1 |
| 7,400,957 B2 | | 7/2008 | Hofer et al. |
| 7,970,512 B2 | | 6/2011 | Lu et al. |
| 8,170,826 B2 | * | 5/2012 | Krammer et al. ............... 702/94 |
| 2002/0046898 A1 | * | 4/2002 | Bloch et al. ................... 180/446 |
| 2010/0138110 A1 | * | 6/2010 | Zell et al. ........................ 701/41 |

FOREIGN PATENT DOCUMENTS

| | | | | |
|---|---|---|---|---|
| DE | 19511301 A1 | * | 10/1996 | |
| DE | 102005053902 A1 | * | 5/2007 | |
| EP | 1873039 A2 | * | 1/2008 | |
| JP | 02144262 A | * | 6/1990 | |
| JP | 02254069 A | * | 10/1990 | |
| JP | 04161806 A | * | 6/1992 | |
| JP | 06255530 A | * | 9/1994 | |
| JP | 000062633 A | * | 2/2000 | |
| JP | 2001239949 A | * | 9/2001 | |
| JP | 2005001667 A | * | 1/2005 | |
| JP | 2007230275 A | * | 9/2007 | |
| JP | 2010120450 A | * | 6/2010 | |

OTHER PUBLICATIONS

EPO Machine Translation of EP 1873039 (original EP document published Jan. 2, 2008).*
JPO Machine Translation of JP2000-62633 (original JP document published Feb. 29, 2000).*
JPO Machine Translation of JP 06-255530 (original JP document published Sep. 13, 1994).*
JPO Machine Translation of JP 2001-239949 (original JP document published Sep. 4, 2001).*

* cited by examiner

*Primary Examiner* — James Trammell
*Assistant Examiner* — David Testardi

(57) ABSTRACT

In one embodiment, a wheel angle sensor calibration method, comprising, while a vehicle is moving, automatically causing movement of the vehicle to a first full steering position followed by automatic movement to a second full steering position; recording wheel angle sensor values at the first and second full steering positions, respectively; determining an average of the wheel angle sensor values, the average corresponding to a target center wheel position; automatically causing movement of the vehicle to the target center wheel position; and responsive to the wheel angle sensor having a value equal to the average, recording the wheel angle sensor value as the target center wheel position.

19 Claims, 5 Drawing Sheets

GUIDANCE SYSTEM AUTOMATIC WHEEL ANGLE SENSOR CALIBRATION

TECHNICAL FIELD

The present disclosure generally relates to vehicle guidance systems.

BACKGROUND

Vehicle technology has advanced tremendously over the past several years, thanks in part to vehicle guidance systems. Vehicle guidance systems automate or semi-automate driver tasks that previously consumed more of the driver's time and/or attention. For instance, some automobiles come equipped with parking assist features that park an automobile without user interaction, or assist the driver in finding a travel destination without requiring the driver to pull the vehicle over and review a map. In agricultural environments, guidance systems may assist a driver (e.g., operator) of, say, a combine harvester or other agricultural vehicle in maintaining a consistent travel direction, such as along a row of crops to be harvested or treated.

By entrusting certain human tasks to the vehicle guidance system, it is important to ensure accuracy to avoid erroneous travel and/or harm to the environment or personnel.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

Moreover, in the drawings, like reference numerals designate corresponding parts throughout the several views.

DESCRIPTION OF EXAMPLE EMBODIMENTS

Overview

Figure 1:
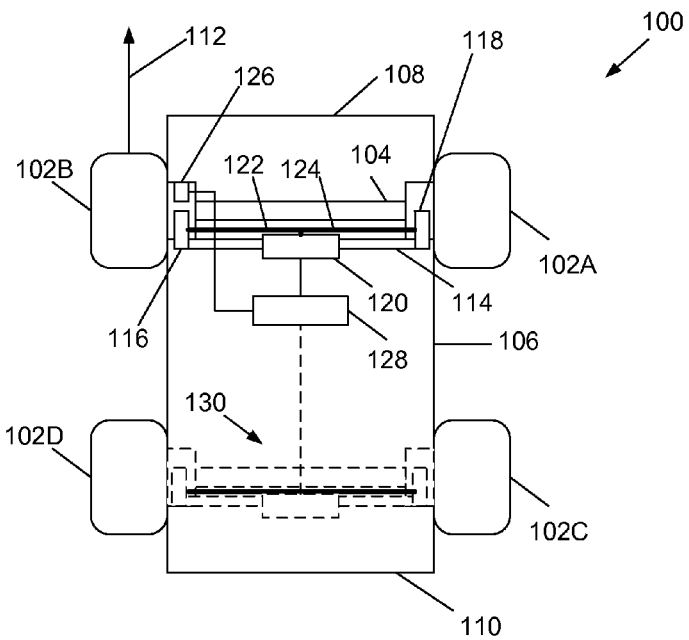
FIG. 1 is a plan view of an example vehicle in which an embodiment of a vehicle guidance system is implemented.

In one embodiment, a wheel angle sensor calibration method, comprising, while a vehicle is moving, automatically causing movement of the vehicle to a first full steering position followed by automatic movement to a second full steering position; recording wheel angle sensor values at the first and second full steering positions, respectively; determining an average of the wheel angle sensor values, the average corresponding to a target center wheel position; automatically causing movement of the vehicle to the target center wheel position; and responsive to the wheel angle sensor having a value equal to the average, recording the wheel angle sensor value as the target center wheel position.

Detailed Description

Disclosed herein are certain embodiments of a guidance system and associated method for a vehicle steering system that calibrates one or more wheel angle sensors in a vehicle. The vehicle steering system may be any one of a variety of known hydraulic and/or electronic steering systems, such as front-wheel steering, rear-wheel steering, a combination of front and rear wheel steering, single-wheel steering, multi-wheel steering, articulated steering, etc. In one embodiment, the guidance system comprises a processor system that automatically calibrates a wheel angle sensor and adjusts for yaw movement. Such a calibration improves the performance of the associated steering system while mitigating the risk of operator error.

Digressing briefly, in conventional steering guidance systems for, say, agricultural vehicles (e.g., combine harvester machine), steering performance is largely dependent upon proper calibration of a wheel angle sensor by the operator. That is, in conventional systems, the operator performs calibration of the wheel angle sensor by manually turning a steering wheel (or other mechanism to steer the vehicle, such as a joystick) to cause the vehicle wheels to move to a full lock position (e.g., left), then to a full lock right position, and then to a center wheel position. The operator generally performs this manual calibration through the assistance of a graphical user interface (GUI) displayed on a display device located in the cab. At each of the locked positions and the center position, the operator enters the associated wheel angle sensor value communicated by the respective wheel angle sensor. Performance of the steering guidance system is dependent on the operator moving the wheels completely and accurately through this calibration procedure. In other words, it is easily possible for an operator to calibrate a wheel angle sensor inaccurately, causing decreased control performance of the steering guidance system when processing guidance commands.

Certain embodiments of a guidance system, as described further below, address these and/or other shortcomings of conventional systems. Although described in the context of a front-wheel steering system that utilizes a single wheel angle sensor, it should be appreciated that other types of steering systems (with the same amount or a different quantity of wheel angle sensors), such as those mentioned above, may benefit from the embodiments disclosed herein and are contemplated to be within the scope of the disclosure. Other systems, methods, features, and advantages of the present disclosure will be or become apparent to one with skill in the art upon examination of the following drawings and detailed description. It is intended that all such additional systems, methods, features, and advantages be included within the scope of the present disclosure. Further, although the description identifies or describes specifics of one or more embodiments, such specifics are not necessarily part of every embodiment. Also, a single embodiment as disclosed herein does not necessarily achieve every advantage or benefit described herein. Further, the claims are not necessarily limited to the particular embodiments set out in the description.

Attention is now directed to FIG. 1, which is a plan view of an example vehicle 100 in which an embodiment of a vehicle guidance system (also referred to herein as simply guidance system) is implemented. It should be appreciated that the vehicle 100 depicted in FIG. 1 is for illustrative, non-limiting purposes, and that other vehicles are contemplated to be within the scope of the disclosure. For instance, though shown as a two-axle, four-wheel vehicle, vehicles with other arrangements of axles and/or wheel configurations are contemplated. Further, one having ordinary skill in the art should understand that the depiction in FIG. 1 omits certain well-known components (e.g., engine, etc.) to avoid obfuscating the disclosed embodiments. The vehicle 100 may be a domestic vehicle, such as a car or truck, or business-related vehicle, such as an agricultural or construction-based machine having wheels, including a combine harvester, sprayer, baler, among other agricultural machines. The example vehicle 100 includes plural wheels 102 (e.g., 102A, 102B, 102C, and 102D), each pair (e.g., 102A, 102B) coupled to a respective axle assembly 104. The vehicle 100 further includes a frame or chassis 106, including a front end 108 and a rear end 110. The forward direction of travel is indicated by reference arrow 112, which also coincides with a center wheel position (e.g., where the wheels are centered to enable straight, forward (or rearward) travel of the vehicle 100.

The vehicle 100 further includes a steering assembly 114. In one embodiment, the steering assembly 114 comprises a linkage to hydraulic cylinders 116 and 118 that are located proximal to respective wheels 102B and 102A. The cylinders 116 and 118 are coupled to a steering valve spool assembly 120, which in one embodiment comprises a well-known spool component (e.g., metal piece) within a hydraulic valve that modulates the flow of fluid to the cylinders 116 and 118 via hoses 122, 124, which in turn enables turning movement of the vehicle 100. As is known, the spool component may be controlled by an actuator (e.g., electronic solenoid) that enables the spool to move horizontally or vertically inside the body of the valve. When the spool component is moved, it diverts a fluid (e.g., oil) allows the oil to flow to one or more different ports on a given valve. The hydraulic fluid may be sourced by one or more hydraulic pumps that are energized by the engine, as is known. The steering valve spool 120 comprises a component of one or more hydraulic valves, though in some embodiments, may comprise a component in electrical/electro-mechanical valves or a combination of both hydraulic and electric-based operation.

In some embodiments, the steering valve spool assembly 120 may be construed as a system or assembly that includes the host valve(s), and optionally other components, such as the hoses 122, 124 and cylinders 116, 118. Further, some embodiments may arrange the steering valve spool assembly 120 proximally to each controlling wheel. Some embodiments may replace the hydraulic valves of the steering valve spool assembly 120 with variable pumps. It should be appreciated that the steering, linkage, and cylinder arrangement is for illustrative purposes, and that other known mechanisms for steering a vehicle may be used in some embodiments.

The vehicle 100 further comprises one or more wheel angle sensors, such as wheel angle sensor 126, which in this example is located proximally to the wheel 102B. In one embodiment, the wheel angle sensor 126 is affixed to the axle assembly 104 (or steering assembly 114 in some embodiments) in proximity to the wheel 102B, though other known mechanisms of placement may be used. The wheel angle sensor 126 measures the wheel angle relative to the center wheel position, such as relative to the reference arrow 112. Note that, although shown associated with wheel 102B, in some embodiments, the wheel angle sensor 126 may be associated with a different wheel 102 that turns and/or additional wheels 102 (e.g., more than one). In some embodiments, the wheel angle sensor 126 may be configured with an integrated controller.

Also shown in FIG. 1 is a processor system 128, which in one embodiment comprises at least a portion of the guidance system. The processor system 128 is coupled to the steering valve spool assembly 120 and the wheel angle sensor 126. In one embodiment, the wheel angle sensor 126 and steering valve spool assembly 120 are coupled to the processor system 128 via a wired connection, though wireless coupling may also be employed in some embodiments. The processor system 128 communicates actuation signals to the steering valve spool assembly 120 and receives data (sensor values) from the wheel angle sensor 126.

Although depicted using a single steering valve spool assembly 120 for the front wheels 102A, 102B (e.g., assuming steering is via the front wheels only), it should be understood within the context of the present disclosure that other control arrangements are contemplated to be within the scope of the disclosure. For instance, in one embodiment, a similar axial and steering and control arrangement as described above may be duplicated, at least in part, by using the arrangement 130 as noted in phantom for the rear wheels 120C and 120D. For instance, a wheel angle sensor (not shown) may be positioned proximal to one or more of the wheels 102C, 102D, and coupled to the processor system 128 and to an additional steering valve spool assembly (shown in phantom in FIG. 1). The additional steering valve spool assembly enables turning of the rear wheels 102C, 102D via hydraulic fluid directed over one or more hoses via control by the processor system 128. In some embodiments, the spool component of the steering valve spool assembly 120 may modulate the fluid flow for turning the rear wheels 102C, 102D (e.g., without the addition of an additional spool valve assembly), among other arrangements.

Figure 2A:
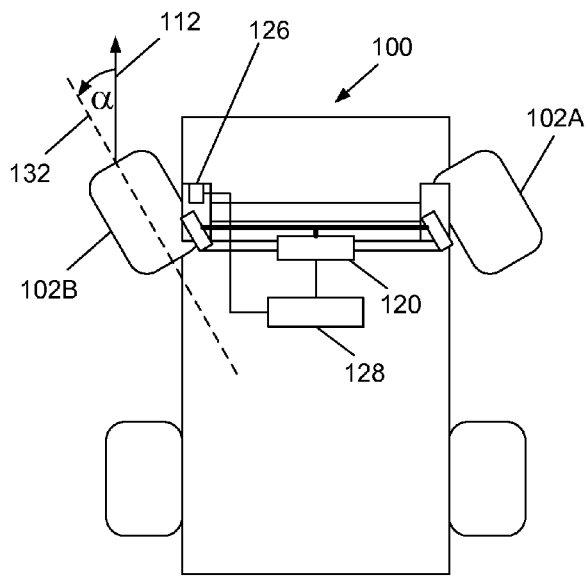
FIGS. 2A and 2B are plan views of an example vehicle that illustrate automated movement of the vehicle to different full steering positions as part of an implementation of an embodiment of a wheel angle sensor calibration method.
Figure 2B:
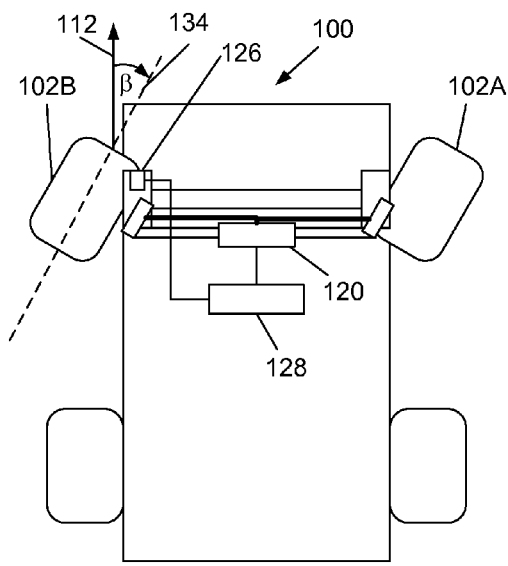

Having described an example vehicle 100 and various components of a guidance system in FIG. 1, attention is directed to FIGS. 2A-2B, which illustrate an example implementation of at least a portion of a wheel angle sensor calibration method. Certain components have been omitted from the vehicle 100 shown in FIG. 1 to avoid obfuscating the example calibration method. For the example depicted in FIGS. 2A-2B, a single wheel angle sensor 126 is positioned proximally to wheel 102B, and the front wheels 102A, 102b are the turning wheels. As noted above, one having ordinary skill in the art should understand in the context of the present disclosure that other arrangements and/or manner of control may be used in some embodiments. In one embodiment, the processor system 128 prompts the driver (e.g., operator) to move the vehicle 100 forward (coincident with reference arrow 112). For instance, a GUI may be presented on a display device residing in the vehicle 100 (e.g., the cab of an agricultural or construction machine), the GUI comprising textual or graphical instructions for the operator to engage the driving mechanisms of the vehicle 100 in an effort to cause forward movement. In some embodiments, selection of a steering calibration button or button icon may set the vehicle 100 in motion. In some embodiments, audible instructions may be conveyed to the operator. Note that in some embodiments, the calibration need not involve the actual guidance mechanisms (e.g., global positioning system, GPS) of the vehicle 100.

In one embodiment, forward movement of the vehicle 100 is constrained to certain vehicle performance settings, such as a predetermined vehicle speed, engine revolutions per minute (RPM), or a combination of both. For instance, the processor system 128, when activating a calibration mode in response to operator input as explained above, may automatically set the performance settings and limit/regulate vehicle movement accordingly. In some embodiments, the GUI presented to the operator may instruct the operator to limit the speed and/or RPMs. In either case, requested RPM settings may correspond to the provision of full hydraulic flow to the wheel assemblies.

The processor system 128 sends an actuation signal to the steering valve spool assembly 120 to cause movement of the wheels 102A, 102B to a first full steering position (e.g., full lock left position in this example) coincident with left steering axis 132. It is noted that in some implementations, the first full steering position may be to the right. In some embodiments, the spool component of the steering valve spool assembly 120 is held in this position for a predetermined length of time (e.g., 5 seconds), the expiration of which results in the processor system 128 recording the wheel angle sensor value (of the locked left position), a, communicated to the processor system 128 from the wheel angle sensor 126. The wheel angle sensor value, $\alpha$, is the position of the wheel angle along axis 132 relative to the reference arrow 112 (the latter coinciding with the center wheel position).

The processor system 128 sends another actuation signal to the spool component of the steering valve spool assembly 120 to cause movement of the wheels 102A, 102B to a second full steering position (e.g., right in this example) coincident with the right steering axis 134, as shown in FIG. 2B. The movement to the right corresponds to a full lock right position. In some embodiments, the spool component of the steering valve spool assembly 120 is held in this position for a predetermined length of time (e.g., 5 seconds), the expiration of which results in the processor system 128 recording the wheel angle sensor value (of the locked right position), $\beta$, communicated to the processor system 128 from the wheel angle sensor 126. The wheel angle sensor value, $\beta$, is the position of the wheel angle along axis 134 relative to the reference arrow 112 (the latter coinciding with the center wheel position).

The processor system 128 computes the average of $\alpha$ and $\beta$ to derive a target center wheel position. The processor system 128 sends an actuation signal to the steering valve spool assembly 120 to cause the hydraulic fluid to cause the wheels 102A, 102B to move to the center wheel position. The processor system 128 monitors the wheel angle sensor 126 throughout this return to the center wheel position. Responsive to the wheel angle sensor 126 having a position (e.g., monitored value) equal (or substantially equal) to the target center wheel position, the position (e.g., monitored value) is recorded and assigned as the target center wheel position. Note that reference to substantially equal may vary per embodiment, but in one embodiment, one tolerance allowed from a perfect match may be +/−0.5%.

In some embodiments, the processor system 128 terminates the calibration upon the recording and assignment of the monitored wheel angle sensor value as the target center wheel position, and then adjustment for errors in, for instance, yaw movement, are made post-calibration. In some embodiments, the calibration process continues to make adjustments in yaw movement (e.g., heading deviations from the target center position), and in some embodiments, real-time adjustment post-calibration may be further employed. Note that in some embodiments, as indicated above, one or more steps of the calibration may be achieved without activating guidance logic (e.g., steering logic may be involved without, for instance, GPS input, at least until yaw sensing and calculation is achieved).

The processor system 128 may communicate the progress of the calibration, including the termination of the calibration process, through a user interface, such as a GUI and/or other visual and/or audio alert. Termination of the calibration process may also be achieved by operator action. For instance, the operator may manually turn the steering wheel (or joystick, or other steering component), which is signaled (e.g., by a sensor located, for instance, on a steering shaft) to the processor system 128, enabling termination of the calibration process.

Figure 3:
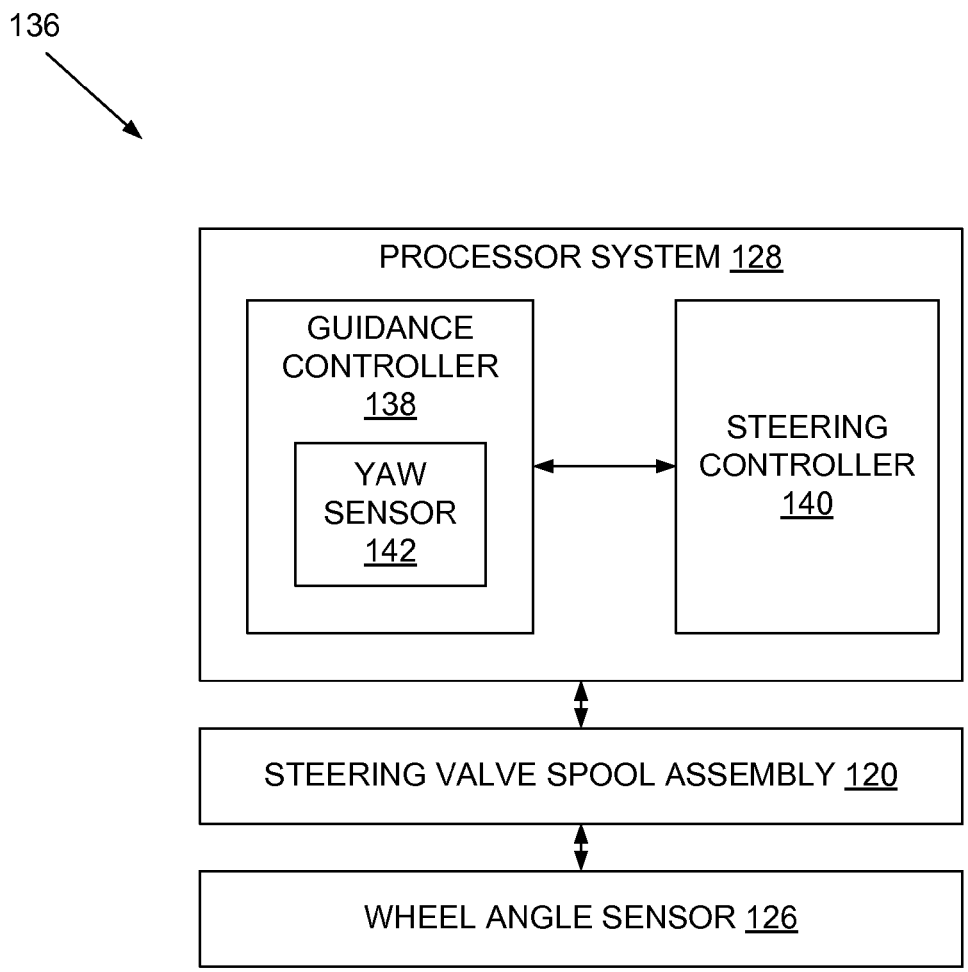
FIG. 3 is a block diagram of an embodiment of an example guidance system used in a vehicle.

Note the guidance system and/or its constituent components may be configured in one of a variety of ways. For instance, with reference to FIG. 3, shown is one example architecture for an embodiment of a guidance system 136. It should be appreciated that the architecture shown in FIG. 3 is illustrative, and that in some embodiments, other configurations may be used. For instance, in some embodiments, the processor system 128 may omit the guidance controller 138, and hence certain processing may occur, such as calibration without a yaw determination, without the guidance controller 138, and the processor system 128 (e.g., the steering controller 140) may communicate with a separate guidance controller 138 for yaw determinations. Returning to the depicted embodiment, the guidance system 136 comprises a processor system 128, the steering valve spool assembly 120, and the wheel angle sensor 126. In some embodiments, the guidance system 136 may comprise fewer or additional components. Note that, though shown using single components, a plurality of respective components of the guidance system 136 may be used in some embodiments. The processor system 128 may be configured with a guidance controller 138 and a steering controller 140. In one embodiment, signals delivered between the guidance controller 138 and the steering controller 140 are formatted according to a given communication protocol, such as CAN (controller area network). In one embodiment, the steering controller 140 may send actuation signals (e.g., 4-20 mA, 0-15V, etc.) to an actuator assembly of the steering valve spool assembly 120, which opens a normally-closed (or closes a normally open) valve of the steering valve spool assembly 120 to enable fluid flow changes and hence turning movement of the wheels (e.g., through actuation of cylinders 116, 118). Other mechanisms and/or hierarchy of control are contemplated to be within the scope of the disclosure.

In some embodiments, the guidance controller 138 may be configured with an embedded or coupled (e.g., externally coupled, such as via a wired or wireless connection) yaw sensor 142. The guidance controller 138 monitors yaw values and changes in yaw, while sending a signal (e.g., 0 degree curvature command) to the steering controller 140. Such a manner of operation enables the guidance controller 138 to determine if the vehicle 100 is turning to the left or the right while intending to navigate a straight line (e.g., coincident with reference arrow 112). The guidance controller 138, through employment of the yaw sensor 142, detects how much error exists and in what direction the error of the calibration is manifested. The guidance controller 138 calculates the error in the current center wheel position (e.g., recorded as the target center wheel position), and adjusts the value to derive an adjusted target center wheel position based on the yaw sensor values. The guidance controller 138 provides the adjusted target center wheel position to the steering controller 140 to enable accurate (e.g., straight) forward (and reverse) travel.

Figure 4:
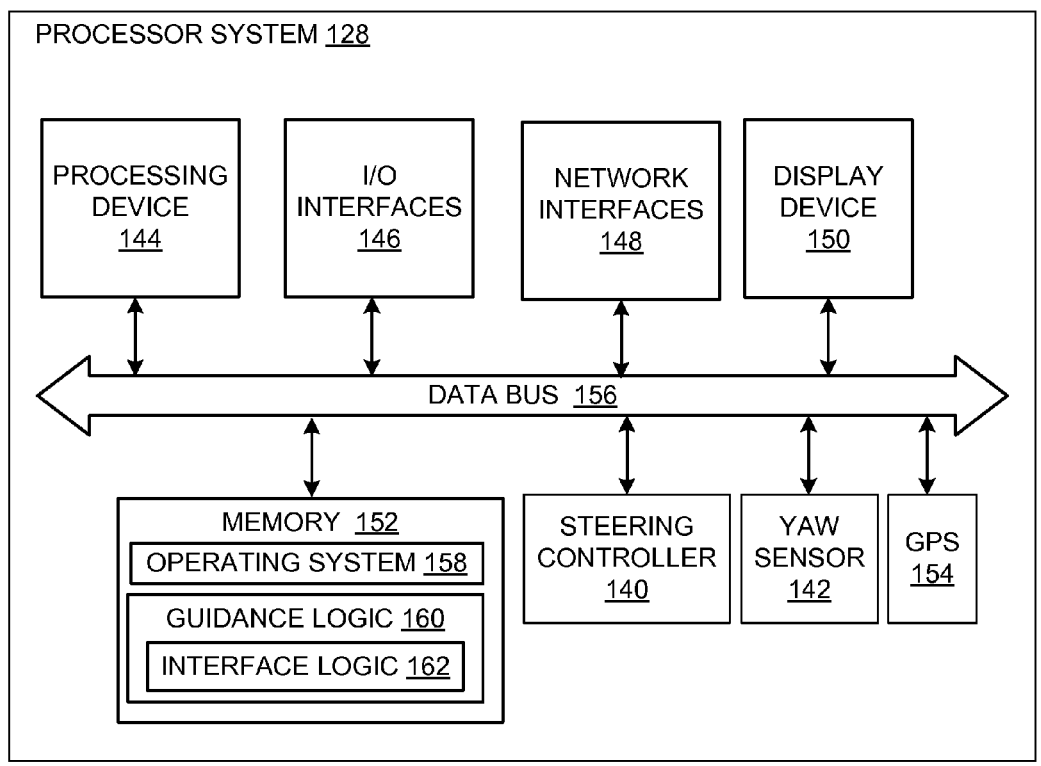
FIG. 4 is block diagram of an embodiment of an example processor system of a guidance system.

Attention is directed to FIG. 4, which shows an embodiment of a processor system 128. It should be appreciated that the processor system 128 depicted in FIG. 4 is for illustrative purposes, and that other configurations with fewer or greater components may be employed in some embodiments. For instance, some embodiments of the processor system 128 may be configured without a steering controller 140, the steering controller 140 comprising a separate device (e.g., similarly configured to the processor system 128 without one or more components, such as the steering controller 140, yaw sensor 142, etc.) coupled to the processor system 128. In some embodiments, the steering controller 140 may comprise logic encoded in memory. The processor system 128 comprises a processing device 144, one or more input/output (I/O)

interface devices 146 (I/O interfaces), one or more network interface devices 148 (network interfaces), a display device 150 (e.g., cathode ray tube (CRT), liquid crystal diode (LCD), etc.), memory 152, the yaw sensor 142, the steering controller 140, and a global positioning system (GPS) device 154 coupled over one or more data busses, such as data bus 156. The memory 152 comprises a native operating system 158 and guidance logic 160 that, in one embodiment, further comprises interface logic 162. In one embodiment, the guidance controller 138 comprises at least the memory 152 and the processing device 144, though not limited to these components. For instance, in some embodiments, the guidance controller 138 further comprises the yaw sensor 142.

The processing device 144 may include any custom made or commercially available processor, a central processing unit (CPU) or an auxiliary processor among several processors associated with the processor system 128, a semiconductor based microprocessor (in the form of a microchip), a macroprocessor, one or more application specific integrated circuits (ASICs), a plurality of suitably configured digital logic gates, and other well-known electrical configurations comprising discrete elements both individually and in various combinations to coordinate the overall operation of the computing system (e.g., processor system 128).

The memory 152 may include any one of a combination of volatile memory elements (e.g., random-access memory (RAM, such as DRAM, and SRAM, etc.)) and nonvolatile memory elements. As indicated above, the memory 152 typically comprises the operating system 158, one or more native applications, emulation systems, or emulated applications for any of a variety of operating systems and/or emulated hardware platforms, emulated operating systems, etc. For example, the applications may include application specific software, such as the guidance logic 160 (and in some embodiments, steering controller logic). One of ordinary skill in the art should appreciate that the memory 152 can, and typically will, comprise other components which have been omitted for purposes of brevity.

The guidance logic 160, through cooperation with the steering controller 140, implements a wheel angle sensor calibration method, as set forth above and further below, to monitor and record full left and right lock positions (values), compute an average of these values, and monitor and record a targeted center wheel position. Optionally, the guidance logic 160 is further configured to receive yaw sensor values from the yaw sensor 142, and further adjust the targeted center wheel position based on the yaw sensor values. The guidance logic 160 further comprises user interface logic 162 (or simply, interface logic) that enables user interactivity with the guidance system 136. For instance, the user interface logic 162 may be configured to present a GUI on a display device, located in proximity to the operator in the vehicle 100, that updates the progress of the calibration, instructs the operator in the maneuvering of the vehicle 100 or configuring of settings during the calibration process, and alerts the operator when calibration has been terminated, among other functions. In some embodiments, the user interface logic 162 may be configured to deliver audible instructions alone or in association with the GUI.

In some embodiment, the processor system 128 may implement at least a portion of the calibration process without the guidance logic 160, yaw sensor 142, and the GPS device 154. For instance, in such embodiments, functionality of the steering controller 140 may be embodied as executable code in memory 152 (e.g., in place of the guidance logic 160 and in place of the steering controller 140) alone or with GUI functionality, that in cooperation with the processing device 144, actuates the full lock movements and records the positions in memory, as well as performs the monitoring and center wheel position calculation.

The I/O interface devices 146 are configured to receive input from a user, such as via a screen of the display device 150, and provides such functionality as on-screen buttons, menus, keyboards, etc. that allows the operator to navigate user interfaces by touch or other manner. The I/O interface devices 146 are configured to enable communication with local devices.

The network interface devices 148 comprise various components (e.g., transceiver logic) used to transmit and/or receive data over a networked environment, including over a CAN network. Note that functionality of the I/O interface devices 146 and network interface devices 148 may be combined in some embodiments.

The steering controller 140, as indicated above, includes functionality to receive recorded sensor values from one or more wheel angle sensors, such as wheel angle sensor 126, communicate those values to the guidance controller 138, and receive signals from the guidance controller 138 that are translated to enable actuation of one or more steering valve spools and hence manipulation of wheel (steering) angle positioning. The steering controller 140 may be implemented in hardware, software (such as the embodiment described above), or a combination of hardware and software. For instance, in one embodiment, the steering controller 140 is implemented as a programmable logic controller (PLC) as a separate device (from the processor system 128) or, as depicted in FIG. 4, as an integral part of the processor system 128 (e.g., with its own processing device, or using the processing device 144 to execute the steering control functionality). It should be appreciated that in some embodiments, functionality of the guidance controller 138 and steering controller 140 may be combined into a single unit or module. Note that in some embodiments, the wheel angle sensor 126 comprises an analog sensor that is input directly into the steering controller 140. Alternatively, in some embodiments, the wheel angle sensor 126 may be configured with an integrated controller (e.g., serving as a CAN-based sensor). In other words, in some embodiments, functionality of the steering controller 140 and the wheel angle sensor 126 as described herein may be combined into an integrated controller/wheel angle sensor.

Other components of the processor system 128 may include the GPS device 154, which comprises known GPS functionality to enable the guidance system 136 to communicate its position (e.g., geographical region). One having ordinary skill in the art should appreciate that other components may be included in the processor system 128, or some components omitted in some embodiments. Further, functionality of some components of the processor system 128 may be combined, or further distributed among additional or different components in some embodiments.

Certain embodiments of the guidance system 136 (or its constituent components) may be implemented in hardware, software, firmware, or a combination thereof. In the embodiment depicted in FIGS. 3-4, the guidance controller 138 is implemented, at least in part, as software or firmware (e.g., guidance control logic 160) that is stored in memory 152 and that is executed by a suitable instruction execution system. The steering controller 140 is implemented as a PLC, though in some embodiments, may be implemented as software stored in the memory 152 (along with the guidance logic 160, or in some embodiments, without the guidance logic). To the extent the guidance system 136 (or its constituent components) is implemented in hardware, the guidance system 136

(or portion thereof) may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
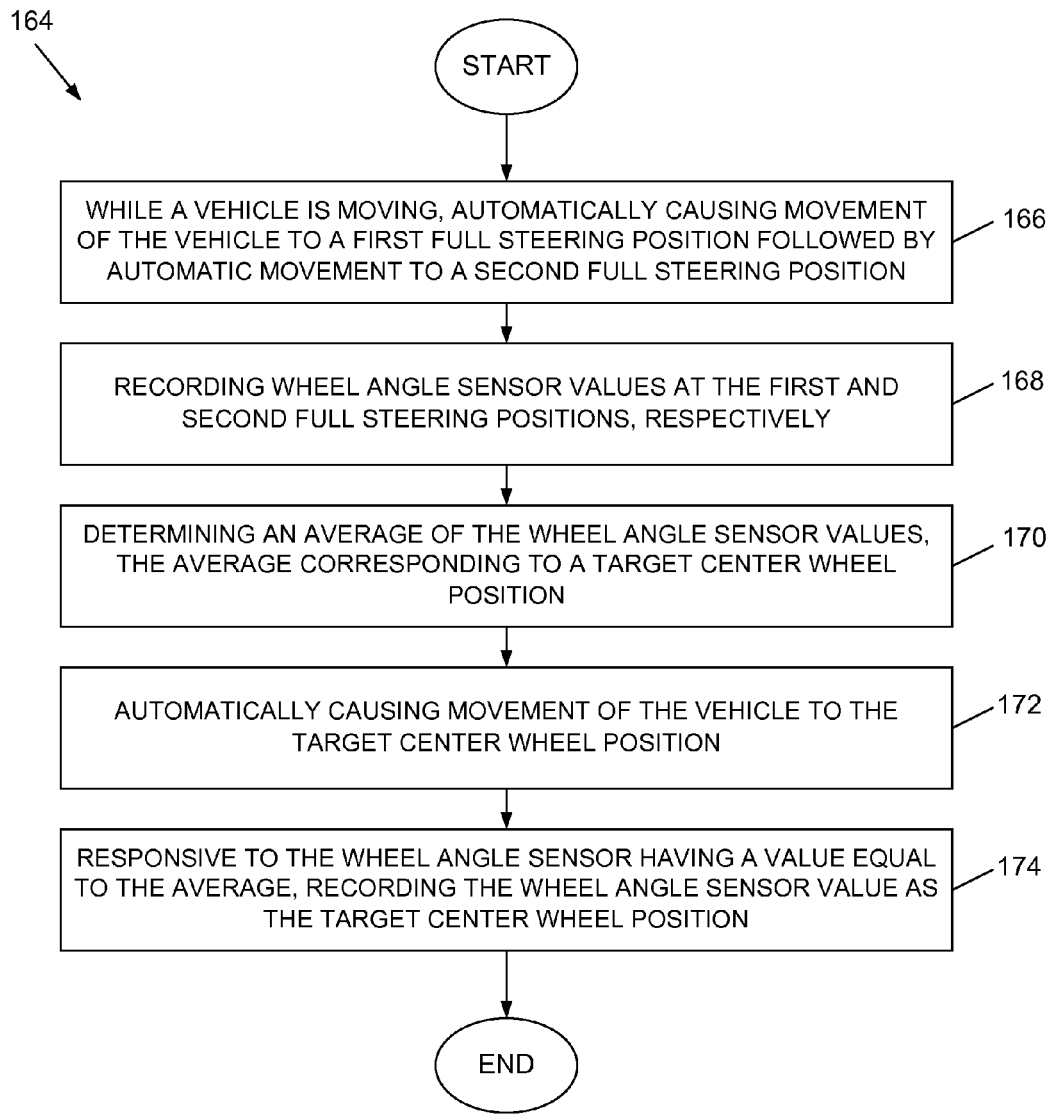
FIG. 5 is a flow diagram that illustrates an embodiment of a wheel angle sensor calibration method.

Having described an example guidance system 136 and constituent components, it should be appreciated that one wheel angle sensor calibration method 164, shown in FIG. 5 and implemented in one embodiment by the guidance system 136 or a subset thereof, includes, while a vehicle is moving, automatically causing movement of the vehicle to a first full steering position followed by automatic movement to a second full steering position (166); recording wheel angle sensor values at the first and second full steering positions, respectively (168); determining an average of the wheel angle sensor values, the average corresponding to a target center wheel position (170); automatically causing movement of the vehicle to the target center wheel position (172); and responsive to the wheel angle sensor having a value equal to the average, recording the wheel angle sensor value as the target center wheel position (174).

Figure 6:
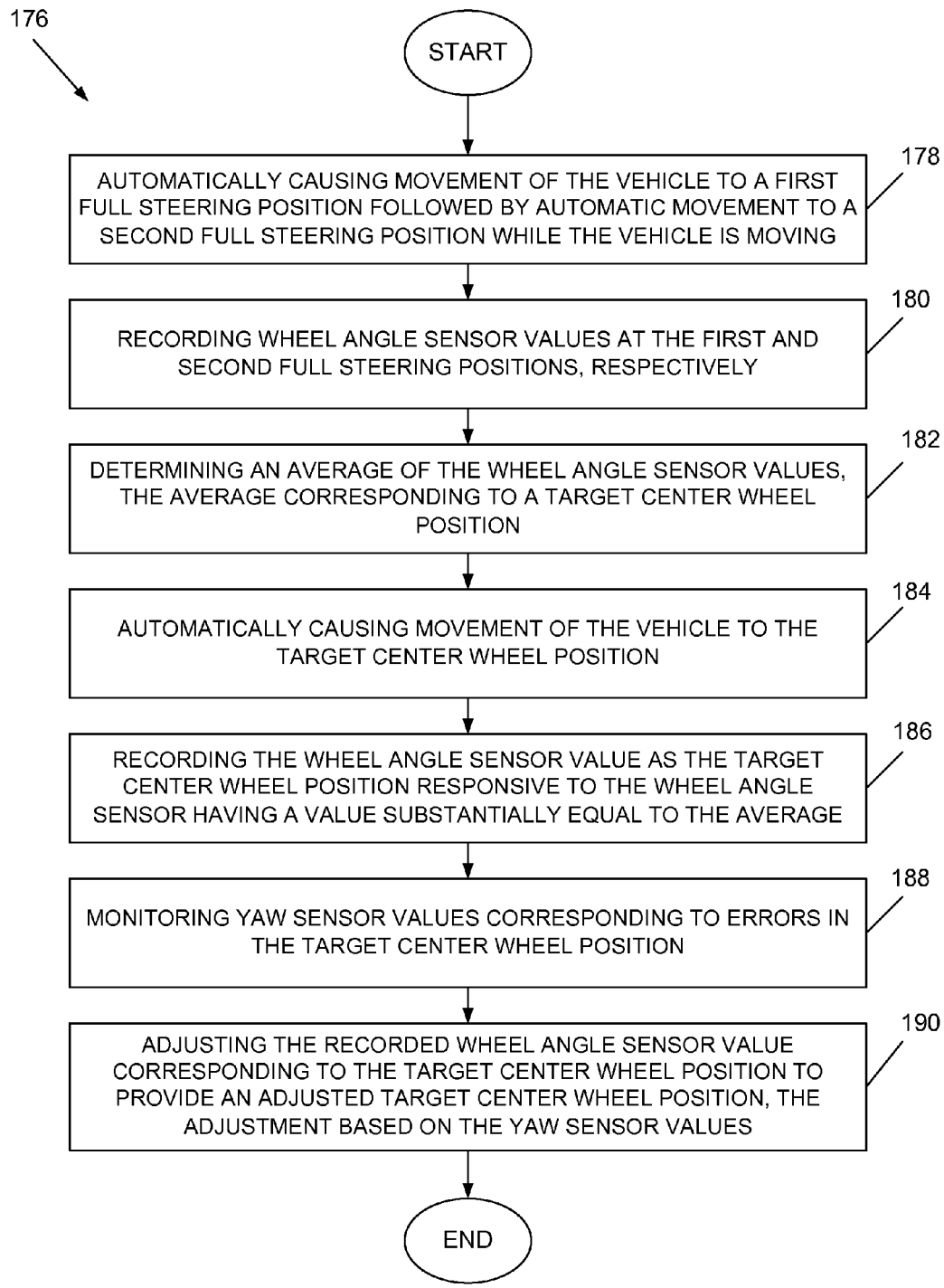
FIG. 6 is a flow diagram that illustrates an embodiment of a guidance method.

In view of the above description, it should be appreciated that an embodiment of a guidance method 176, as implemented in one embodiment by the guidance system 136 (or a subset thereof, or in some embodiments, distributed among plural, separate devices or systems) and shown in FIG. 6, includes automatically causing movement of the vehicle to a first full steering position followed by automatic movement to a second full steering position while the vehicle is moving (178); recording wheel angle sensor values at the first and second full steering positions, respectively (180); determining an average of the wheel angle sensor values, the average corresponding to a target center wheel position (182); automatically causing movement of the vehicle to the target center wheel position (184); recording the wheel angle sensor value as the target center wheel position responsive to the wheel angle sensor having a value substantially equal to the average (186); monitoring yaw sensor values corresponding to errors in the target center wheel position (188); and adjusting the recorded wheel angle sensor value corresponding to the target center wheel position to provide an adjusted target center wheel position, the adjustment based on the yaw sensor values (190). It should be appreciated in the context of the present disclosure that the method 176 illustrated in FIG. 6 may be implemented as part of a calibration process, or in some embodiments, implemented at least in part during an initial calibration and in part during field operations (e.g., while harvesting crops), such as a real-time adjustment or calibration for yaw.

Any process descriptions or blocks in the flow diagrams shown in FIGS. 5-6 should be understood as representing modules, segments, or portions of code which include one or more executable instructions for implementing specific logical functions or steps in the process, and alternate implementations are included within the scope of the embodiments of the present disclosure in which functions may be executed out of order from that shown or discussed, including substantially concurrently or in reverse order, depending on the functionality involved, as would be understood by those reasonably skilled in the art of the present disclosure. Further, though described in the context of the example guidance system 136 shown in FIG. 3, it should be appreciated in the context of the present disclosure that the methods depicted in FIGS. 5-6 are not limited to the architecture shown in FIG. 3.

In addition, the scope of certain embodiments of the present disclosure includes embodying the functionality of the guidance system embodiments in logic embodied in hardware and/or software-configured mediums.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A wheel angle sensor calibration method, comprising:
   while a vehicle is moving, automatically causing movement of the vehicle to a first full steering position followed by automatic movement to a second full steering position;
   recording wheel angle sensor values at the first and second full steering positions, respectively;
   determining an average of the wheel angle sensor values, the average corresponding to a target center wheel position;
   automatically causing movement of the vehicle to the target center wheel position;
   responsive to the wheel angle sensor having a value equal to the average, recording the wheel angle sensor value as the target center wheel position;
   detecting a signal corresponding to manual movement by an operator of a steering wheel of the vehicle;
   terminating the calibration responsive to the detection; and
   alerting an operator via a user interface at a time corresponding to the termination of the calibration.

2. The method of claim 1, further comprising monitoring yaw sensor values corresponding to errors in the target center wheel position.

3. The method of claim 2, further comprising adjusting the recorded wheel angle sensor value corresponding to the target center wheel position to provide an adjusted target center wheel position, the adjusting based on the yaw sensor values.

4. The method of claim 1, further comprising updating a user through a user interface of the progress of the calibration.

5. The method of claim 4, wherein the user interface comprises a graphical user interface.

6. The method of claim 1, wherein automatically causing movement of the vehicle comprises actuating a spool component of a steering valve spool assembly.

7. The method of claim 6, wherein the steering valve spool assembly comprises a hydraulic-valve.

8. The method of claim 1, wherein recording the wheel angle sensor values at the first and second full steering positions is responsive to actuating a spool component of a steering valve spool assembly for a predetermined duration.

9. A wheel angle sensor calibration method, comprising:
   while a vehicle is moving, automatically causing movement of the vehicle to a first full steering position followed by automatic movement to a second full steering position;
   recording wheel angle sensor values at the first and second full steering positions, respectively;
   determining an average of the wheel angle sensor values, the average corresponding to a target center wheel position;
   automatically causing movement of the vehicle to the target center wheel position; and responsive to the wheel angle sensor having a value equal to the average, recording the wheel angle sensor value as the target center wheel position,
wherein automatically causing movement of the vehicle to the first and second full steering positions is responsive to reaching a predetermined vehicle travel speed, engine revolutions per minute (RPM), or a combination of vehicle travel speed and engine RPM.

10. The method of claim 9, further comprising providing a user interface to the operator with instructions corresponding to adjusting speed, RPM, or speed and RPM settings.

11. A system, comprising:
a first controller in a vehicle configured to:
automatically cause movement of the vehicle to a first full steering position followed by automatic movement to a second full steering position while the vehicle is moving;
record wheel angle sensor values at the first and second full steering positions, respectively;
determine an average of the wheel angle sensor values, the average corresponding to a target center wheel position;
automatically cause movement of the vehicle to the target center wheel position;
record the wheel angle sensor value as the target center wheel position responsive to the wheel angle sensor having a value substantially equal to the average;
detect a signal corresponding to manual movement by an operator of a steering wheel of the vehicle;
terminate the calibration responsive to the detection; and
cause a user interface to alert an operator at a time corresponding to the termination of the calibration.

12. The system of claim 11, further comprising a second controller comprising a yaw sensor, the second controller configured to:
monitor yaw sensor values corresponding to errors in the target center wheel position; and
adjust the recorded wheel angle sensor value corresponding to the target center wheel position to provide an adjusted target center wheel position, the adjustment based on the yaw sensor values.

13. The system of claim 12, wherein the first controller and the second controller are configured in a processor system.

14. The system of claim 12, wherein the first controller and the second controller are configured in separate processor systems.

15. The system of claim 11, further comprising a wheel angle sensor, the first controller configured to record the wheel angle sensor values in memory responsive to receiving the wheel angle sensor values from the wheel angle sensor.

16. The system of claim 15, wherein the wheel angle sensor is integrated with the first controller.

17. A vehicle, comprising:
a frame body;
plural wheels coupled to the frame body;
a wheel angle sensor associated with at least one of the plural wheels; and
a guidance system configured to:
automatically cause movement of the vehicle to a first full steering position followed by automatic movement to a second full steering position while the vehicle is moving;
record wheel angle sensor values at the first and second full steering positions, respectively;
determine an average of the wheel angle sensor values, the average corresponding to a target center wheel position;
automatically cause movement of the vehicle to the target center wheel position;
record the wheel angle sensor value as the target center wheel position responsive to the wheel angle sensor having a value substantially equal to the average;
monitor yaw sensor values corresponding to errors in the target center wheel position;
adjust the recorded wheel angle sensor value corresponding to the target center wheel position to provide an adjusted target center wheel position, the adjustment based on the yaw sensor values;
detect a signal corresponding to manual movement by an operator of a steering wheel of the vehicle;
terminate the calibration responsive to the detection; and
provide an alert to an operator at a time corresponding to the termination of the calibration.

18. A system, comprising:
a controller in a vehicle configured to:
automatically cause movement of the vehicle to a first full steering position followed by automatic movement to a second full steering position while the vehicle is moving, wherein the controller automatically causes the movement in response to reaching a predetermined vehicle travel speed, engine revolutions per minute (RPM), or a combination of vehicle travel speed and engine RPM;
record wheel angle sensor values at the first and second full steering positions, respectively;
determine an average of the wheel angle sensor values, the average corresponding to a target center wheel position;
automatically cause movement of the vehicle to the target center wheel position; and
record the wheel angle sensor value as the target center wheel position responsive to the wheel angle sensor having a value substantially equal to the average.

19. A vehicle, comprising:
a frame body;
plural wheels coupled to the frame body;
a wheel angle sensor associated with at least one of the plural wheels; and
a guidance system configured to:
automatically cause movement of the vehicle to a first full steering position followed by automatic movement to a second full steering position while the vehicle is moving, wherein the controller automatically causes the movement in response to reaching a predetermined vehicle travel speed, engine revolutions per minute (RPM), or a combination of vehicle travel speed and engine RPM;
record wheel angle sensor values at the first and second full steering positions, respectively;
determine an average of the wheel angle sensor values, the average corresponding to a target center wheel position;
automatically cause movement of the vehicle to the target center wheel position;
record the wheel angle sensor value as the target center wheel position responsive to the wheel angle sensor having a value substantially equal to the average;
monitor yaw sensor values corresponding to errors in the target center wheel position; and
adjust the recorded wheel angle sensor value corresponding to the target center wheel position to provide an adjusted target center wheel position, the adjustment based on the yaw sensor values.

* * * * *